United States Patent
Momin et al.

(10) Patent No.: US 10,411,451 B2
(45) Date of Patent: Sep. 10, 2019

(54) HANGER BRACKET FOR JUNCTION BOX IN RETROFIT APPLICATIONS

(71) Applicant: ABL IP Holding LLC, Decatur, GA (US)

(72) Inventors: Mohamed Momin, Scottdale, GA (US); Mark Major, Decatur, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/665,665

(22) Filed: Aug. 1, 2017

(65) Prior Publication Data
US 2019/0044313 A1    Feb. 7, 2019

(51) Int. Cl.
| | | |
|---|---|---|
| *F21V 21/34* | (2006.01) | |
| *H02G 3/20* | (2006.01) | |
| *F21V 21/03* | (2006.01) | |
| *F21S 8/02* | (2006.01) | |
| *F21V 21/04* | (2006.01) | |
| *F21V 23/00* | (2015.01) | |
| *F21V 21/22* | (2006.01) | |
| *H02G 3/10* | (2006.01) | |

(52) U.S. Cl.
CPC ............... *H02G 3/20* (2013.01); *F21V 21/03* (2013.01); *F21S 8/026* (2013.01); *F21V 21/048* (2013.01); *F21V 21/22* (2013.01); *F21V 21/34* (2013.01); *F21V 23/002* (2013.01); *H02G 3/10* (2013.01)

(58) Field of Classification Search
USPC .......................................... 248/342, 343, 344
See application file for complete search history.

(56) References Cited

U.S. PATENT DOCUMENTS

| | | | | |
|---|---|---|---|---|
| 2,140,861 A | * | 12/1938 | Steketee | H02G 3/126 174/63 |
| 2,738,990 A | * | 3/1956 | Hill | H02G 3/085 220/266 |
| 3,425,655 A | * | 2/1969 | Cogdill | F16L 3/22 211/123 |
| 4,518,141 A | | 5/1985 | Parkin | |
| 4,538,786 A | | 9/1985 | Manning | |
| 4,645,158 A | | 2/1987 | Manning | |
| 5,150,868 A | * | 9/1992 | Kaden | H02G 3/126 248/200.1 |
| 5,209,444 A | * | 5/1993 | Rinderer | H02G 3/126 248/205.1 |

(Continued)

OTHER PUBLICATIONS

Garvin Electrical Manufacturer, "4 in octagon fan & fixture support box, 2 ⅛ in. deep, old work bar hanger", retrieved from: https:www.garvinindustries.com/electrical-junction-boxes/octagon-junction-boxes/2-1-8-in-deep-bracket-boxes/54171-fanow, 2017, (1 page).

(Continued)

*Primary Examiner* — Alfred J Wujciak
(74) *Attorney, Agent, or Firm* — Kilpatrick Townsend & Stockton LLP

(57) ABSTRACT

A bracket facilitates retrofit installation of items in a joist cavity. For example, the bracket permits mounting of a junction box containing a transformer, for use with low-voltage luminaire. The bracket wedges between the joists and provides a mounting for the junction box so that the junction box does not rest on a ceiling panel fixed to the underside of the joist cavity.

2 Claims, 7 Drawing Sheets

(56) References Cited

U.S. PATENT DOCUMENTS

| | | | | |
|---|---|---|---|---|
| 6,033,098 A * | 3/2000 | Hentz | ............... | B62J 6/00 |
| | | | | 248/228.7 |
| 7,429,025 B1 * | 9/2008 | Gretz | ............... | H02G 3/20 |
| | | | | 248/200.1 |
| 7,952,022 B2 * | 5/2011 | Rippel | ............... | H02G 3/125 |
| | | | | 174/50 |
| 2002/0171019 A1 * | 11/2002 | Johnson | ............... | H02G 3/125 |
| | | | | 248/343 |
| 2008/0067313 A1 | 3/2008 | Herth | | |
| 2008/0230668 A1 * | 9/2008 | Johnson | ............... | H02G 3/20 |
| | | | | 248/343 |
| 2008/0296460 A1 * | 12/2008 | Kerr, Jr. | ............... | F21V 21/02 |
| | | | | 248/343 |

OTHER PUBLICATIONS

Westinghouse, "Westinghouse lighting 0110000 saf-t-brace for ceiling fans, 3 teeth, twist and lock", retrieved from https://www.amazon.com/dp/B00027EWNW/ref=cm_sw_r_pi_dp_c2fztb0N8X22JPP6, 2017, (8 pages).

* cited by examiner

HANGER BRACKET FOR JUNCTION BOX IN RETROFIT APPLICATIONS

BACKGROUND OF THE INVENTION

It is often desirable to add a light fixture in an existing building or structure. Adding a light in this way is called a "retrofit" operation, and may pose difficulties because wall cavities, joist cavities, attics, and the like where wiring and light fixtures are often placed may not be as accessible as they were when the building was under construction. For example, in new construction, metal cans for holding recessed lighting fixtures may be positioned between ceiling joists before any ceiling panel is installed. At that time, the joist cavity is freely accessible for fixing the can in place to the joists, attaching wiring, and the like. Once the can is in place and connected, a ceiling panel such as a drywall panel may be installed on the joists at the bottom of the joist cavity, leaving an opening at the can for inserting a bulb or trim into the can from below the finished ceiling.

However, after construction is complete, a joist cavity where lighting is desired may be completely covered by a ceiling panel, blocking access to the joist cavity. Various devices and techniques have been developed for installing retrofit lighting. For example, a round opening may be cut into the ceiling panel, for installation of a "retrofit can" having springs or other features for mounting to the ceiling panel. Once wiring is connected to the can, the can may snap into the opening to be supported by the ceiling panel. A bulb or trim can then be installed from below the ceiling.

In other cases, it may not be desirable to use a retrofit can. For example, if a low voltage light is being installed, it may be necessary to connect the light to a transformer. Line voltage wiring is connected to the transformer, which provides power at a low voltage (typically 12 or 24 volts) at its outputs. A low voltage luminaire is then attached to the output of the transformer. Preferably, the transformer is hidden within the joist cavity through an opening in the ceiling panel. The luminaire is then installed in the opening to complete a finished look.

While it may be expeditious to simply lay the transformer on top of the ceiling panel in the joist cavity, building codes may prohibit such an installation, and may require that the transformer not touch the ceiling panel.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

According to one aspect, a method comprises inserting a bracket through an opening in a ceiling panel into a cavity above the ceiling panel and between two ceiling joists. The bracket has a length longer than a distance between the two joists. The method further comprises wedging the bracket between the two joists at a height above the ceiling panel such that the bracket is supported above the ceiling panel by friction or interference between the ends of the bracket and the ceiling joists. Wedging the bracket between the joists comprises moving the bracket toward perpendicularity with faces of the joists while the ends of the bracket contact the joists. The method further comprises inserting a junction box into the opening in the ceiling panel and attaching the junction box to the bracket so that the junction box is suspended between the two joists and above the ceiling panel. In some embodiments, the length of the bracket is settable, and the method further comprises setting the length of the bracket to be longer than the distance between the two joists, and fixing the length of the bracket. In some embodiments, setting the length of the bracket to be longer than the distance between the two joists comprises moving two telescoping portions of the bracket relative to each other until the bracket is a desired length, and fixing the length of the bracket comprises fixing the two telescoping portions of the bracket to each other using a fastener. In some embodiments, the method further comprises electrically connecting a luminaire to the junction box, and installing the luminaire in the opening in the ceiling panel. In some embodiments, attaching the junction box to the bracket comprises: attaching a mount to the bracket, the mount including one or more mounting features for attaching the junction box to the mount; and attaching the junction box to the mounting features. In some embodiments, attaching a mount to the bracket comprises snapping a plastic mount to the bracket, the plastic mount including one or more protrusions for hanging the junction box on the plastic mount. In some embodiments, the ends of the bracket include one or more pointed features, and the bracket is supported above the ceiling panel by interference between the pointed features and the ceiling joists, the pointed features digging into the ceiling joists when the bracket is wedged between the ceiling joists.

According to another aspect a bracket for mounting a junction box between joists in a ceiling comprises first and second substantially rigid elongate pieces shaped to fit together in a telescoping relationship. The first and second substantially rigid pieces define openings for receiving a fastener to fix the pieces to each other. The bracket further comprises the fastener for fixing the two substantially rigid elongate pieces to each other at a selected telescoping position, to set an overall length of the bracket. The bracket does not include any machine for changing its length or for forcing the ends of the bracket against the joists. In some embodiments, the first and second elongate pieces do not include any holes near their ends for receiving fasteners to fasten the elongate pieces to the joists. In some embodiments, the bracket further comprises a mount shaped and sized to attach to one or both of the first and second elongate pieces, the mount having protruding mounting features shaped to receive the junction box. In some embodiments, the bracket comprises one or more features integrally formed into either or both of the substantially rigid elongate pieces and shaped to receive the junction box. In some embodiments, the bracket is combined with the junction box, and the junction box includes a sheet metal shell having one or more holes in one side, the holes shaped and positioned for mounting the junction box to the bracket. The one or more holes may comprise one or more keyhole slots. In some embodiments, the bracket further comprises pointed features integrally formed in the ends of the bracket, the pointed features positioned to dig into the joists when the bracket is wedged between the joists.

According to another aspect, a method of installing a bracket between two joists comprises providing a bracket, and setting the length of the bracket to be longer than the distance between the two joists. Setting the length of the bracket is accomplished by direct movement of a first piece of the bracket in relation to a second piece of the bracket without the use of a machine. The method further comprises fixing the length of the bracket and inserting the bracket into a cavity between the two joists. The method also comprises wedging the bracket between the two joists such that the bracket is supported by friction or interference between the ends of the bracket and the joists. Wedging the bracket between the joists comprises moving the bracket toward perpendicularity with faces of the joists while the ends of the bracket contact the joists. In some embodiments, inserting the bracket into the cavity comprises inserting the bracket through an opening in a ceiling panel previously fixed to the joists. In some embodiments, the method further comprises hanging a junction box from the bracket. In some embodiments, the joists are ceiling joists having bottom edges, and wherein the junction box is hung from the bracket at a height so as to be positioned above the bottom edges of the ceiling joists.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
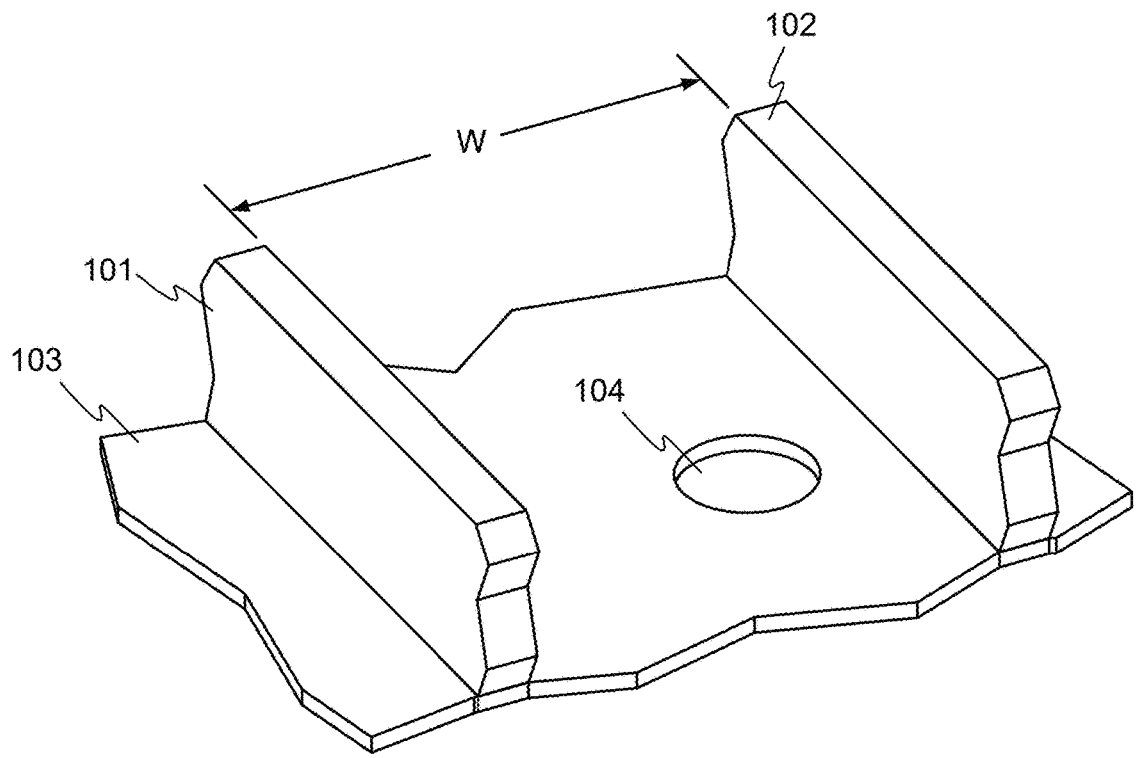
FIG. 1 depicts a cutaway view from above of a portion of a joist cavity into which a light fixture may be installed in accordance with embodiments of the invention.

FIG. 1 depicts a cutaway view from above of a portion of a joist cavity into which a light fixture may be installed in accordance with embodiments of the invention. Two joists 101 and 102 support a ceiling panel 103. The joists 101 and 102 are typically made of wood, such as nominally 2×6 inch framing lumber, although other materials are possible. The joists 101 and 102 are spaced apart by a distance W, which may be a standard or non-standard distance. For example, many joists may be spaced 16 or 24 inches "on center" so that the distance W between their opposing faces may be nominally 14.5 or 22.5 inches. However, other distances are possible.

The ceiling panel 103 may be a drywall panel nailed or screwed to the underside of the joists 101 and 102, or may be another material. In FIG. 1, an opening 104 has already been cut in the ceiling panel 103, of the proper size for installing the fixture. For example, the opening 104 may be about 6 inches in diameter, although other sizes are possible.

Figure 2:
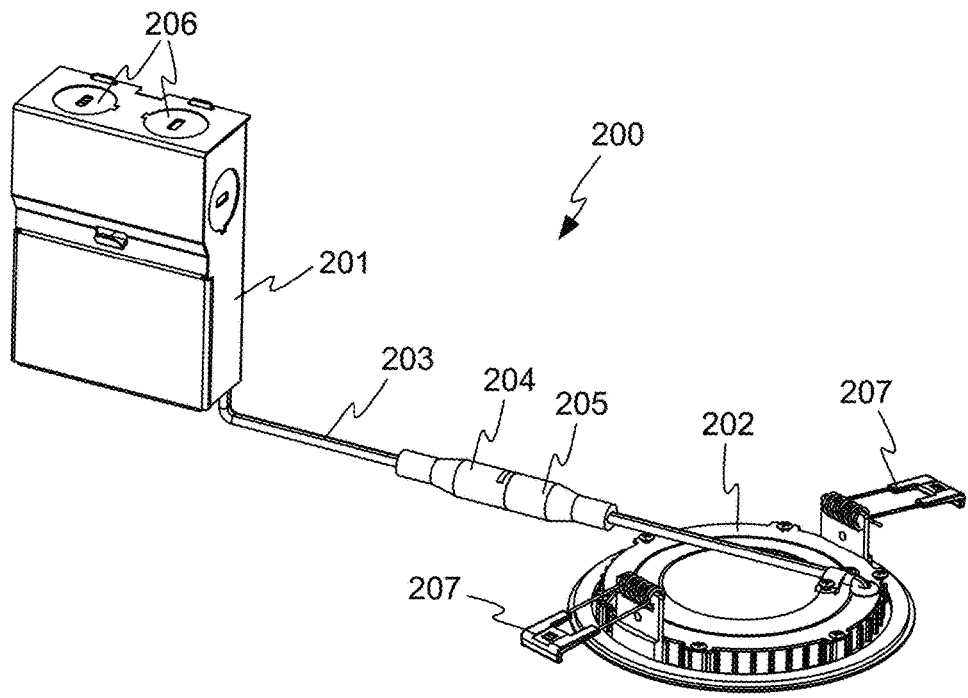
FIG. 2 depicts an example light fixture that may be installed in the joist cavity of FIG. 1 in accordance with embodiments of the invention.
Figure 3:
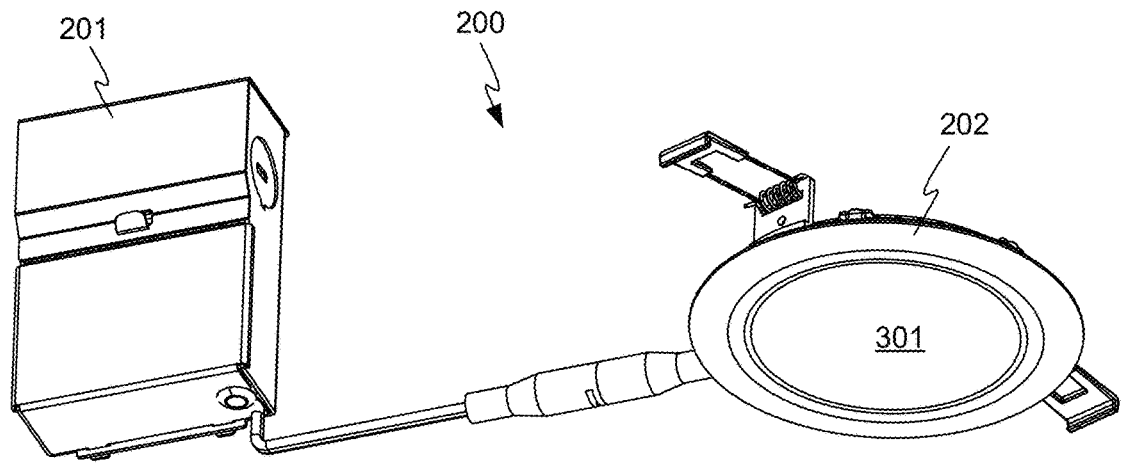
FIG. 3 shows the light fixture of FIG. 2 from below.

FIG. 2 depicts an example light fixture 200 that may be installed in the joist cavity of FIG. 1 in accordance with embodiments of the invention. The light fixture 200 includes a junction box 201 and a luminaire 202, connected by a cable 203, which may be separable using connectors 204 and 205. FIG. 3 shows the light fixture 200 from below, revealing an exit face 301 from which light is emitted by the luminaire 202 into a room or other space below the luminaire 202 when the luminaire 202 is energized. Many other kinds of lights and light fixtures may be installed in accordance with embodiments of the invention, the light fixture 200 being but one example.

The junction box 201 may house a transformer (not visible), and may include knock-out tabs 206 for accessing the interior of the junction box 201. For example, wiring (not shown) may bring line voltage power into the junction box 201 through one of the knock-out tabs 206. Other wiring may connect the junction box 201 to another similar junction box on the same circuit through a different one of the knock-out tabs 206. The line voltage power may be alternating current (AC) power, the voltage of which depends on the location of the installation. For example, in the United States, line voltage power is often delivered at about 110 or 220 volts, 60 Hz. The transformer within the junction box 201 may convert the line voltage power to lower-voltage direct-current (DC) power, for example 12 or 24 volts DC, to supply the low-voltage luminaire 202.

Spring clips 207 are configured to hold the luminaire 202 upward against the ceiling panel 103 once the light fixture 200 is installed, as is explained in more detail below.

Embodiments of the invention facilitate the installation of a lighting fixture such as the light fixture 200 into a joist cavity without having a junction box resting on a ceiling panel. Embodiments of the invention may be especially suited to retrofit applications as described below, but the invention is not so limited, and embodiments of the invention may be used in new construction as well.

Figure 4:
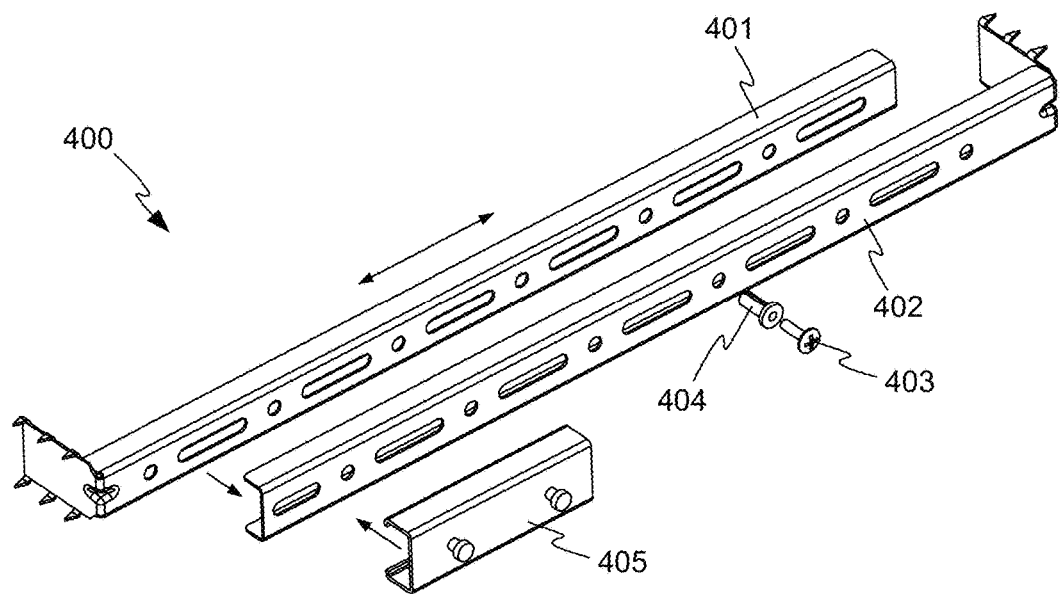
FIG. 4 shows an exploded view of a bracket, in accordance with an embodiment of the invention.
Figure 5:
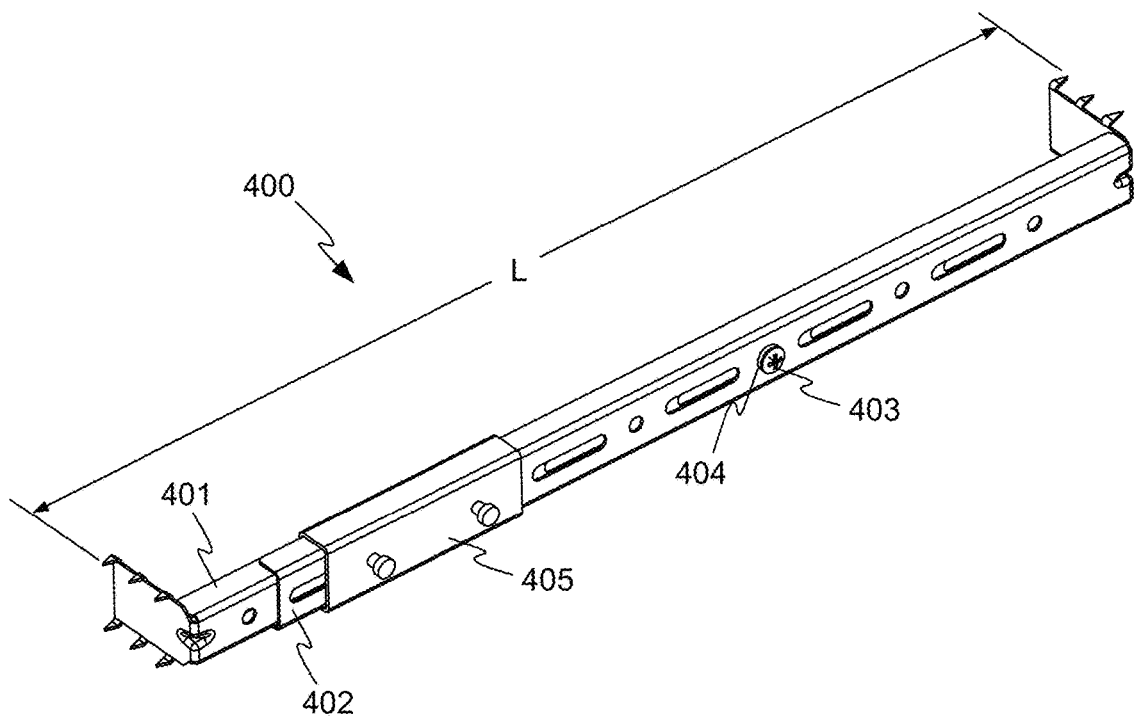
FIG. 5 shows an assembled view of the bracket of FIG. 4.

FIG. 4 shows an exploded view of a bracket 400, in accordance with an embodiment of the invention, and FIG. 5 shows an assembled view of the bracket 400. Two elongate main pieces 401 and 402 are substantially rigid and are shaped and sized to fit together in a telescoping relationship. That is, in this example, the first main piece 401 has a slightly smaller cross section than the second main piece 402, and can fit and slide lengthways within the "C" shape of the piece 402.

A screw 403 enables fixing the main pieces 401 and 402 together to set the length of the bracket 400. In the example shown, the screw 403 threads into a screw rivet 404, which is inserted through openings in the main pieces 401 and 402. In other embodiments, the screw 403 may thread into a threaded hole in one of the main pieces, may be a self-tapping screw, or may be another kind of screw. In other embodiments other kinds of fasteners may be used to fix the main pieces 401 and 402 together, for example a rivet, a bolt, or other kind of fastener.

Other shapes and fastening techniques are also possible. For example, main pieces 401 and 402 may have an L-shaped cross section or another shape. In other embodiments, more than one fastener may be used to fix the main pieces 401 and 402 together.

An optional clip 405 may be provide, the purpose of which is described in more detail below.

To use the bracket 400, the user determines the distance W between the joists 101 and 102, and sets the length of the bracket 400 to be longer than the joist spacing. For example, the length L shown in FIG. 5 is longer than the distance W shown in FIG. 1. The length of the bracket is measured between the most distal features of the bracket, including any gripping or friction-enhancing features. To set the length of the bracket 400, the user slides the first main piece 401 inside the second main piece 402 until distance L is just larger than the joist spacing, and then tightens the screw 403 or another fastener.

The bracket 400 is manually adjustable, and does not include any machine for changing its length. For the purposes of this disclosure, a "machine" is a device or arrangement of elements that multiplies or redirects force. Examples of machines include levers, wedges, pulleys, screws, and wheels. In embodiments of the present invention, the user simply pushes or pulls directly on main the pieces 401 and 402 to adjust the overall length of the bracket 400. (The screw 403 is not used for changing the length of the bracket 400, but only for fixing the length once the length is set by the user.)

Figure 6:
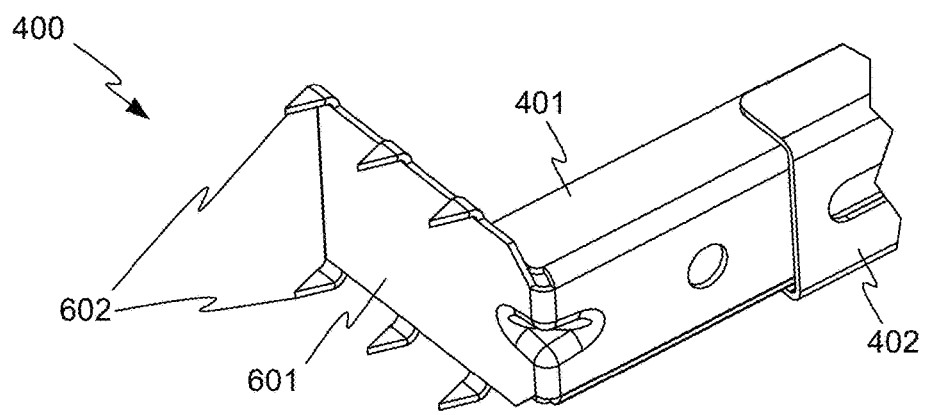
FIG. 6 is an enlarged view of one end of the bracket of FIG. 4.

FIG. 6 is an enlarged view of one end of the bracket 400. An end wall 601 is attached to the first main piece 401, and a similar end wall may be attached to the second main piece 402 at the other end of the bracket 400. The main pieces 401 and 402 may be made of any suitable material and by any suitable process. In one embodiment, the main pieces 401 and 402 are stamped from sheet steel, but other materials and process may be used. For example, the main pieces 401 and 402 could be extruded, pultruded, injection molded, cast, or made by another process from metal, plastic, or another material.

The end walls 601 may be integrally formed with their respective main pieces 401 and 402, for example in a sheet metal stamping process. For the purposes of this disclosure, to be "integrally formed" means that the integrally formed features are included in a single, monolithic piece of material. Parts made separately and attached to each other by fasteners, welding, adhesives, or other means are not integrally formed with each other.

In other embodiments, the end walls 601 may be made from separate parts and attached to the main pieces 401 and 402, for example by welding, using fasteners, using adhesives, or by another technique. In the example shown, the end walls 601 are integrally formed with the main pieces 401 and 402 during sheet metal stamping. In some embodiments, the end walls 601 may not include any through holes that might be used for attaching the end walls 601 to joists 101 and 102. In other embodiments, no distinct end walls may be provided.

In the example shown, any number of pointed features 602 are provided on the end wall 601, the purpose of which will be explained in more detail below.

Figure 7:
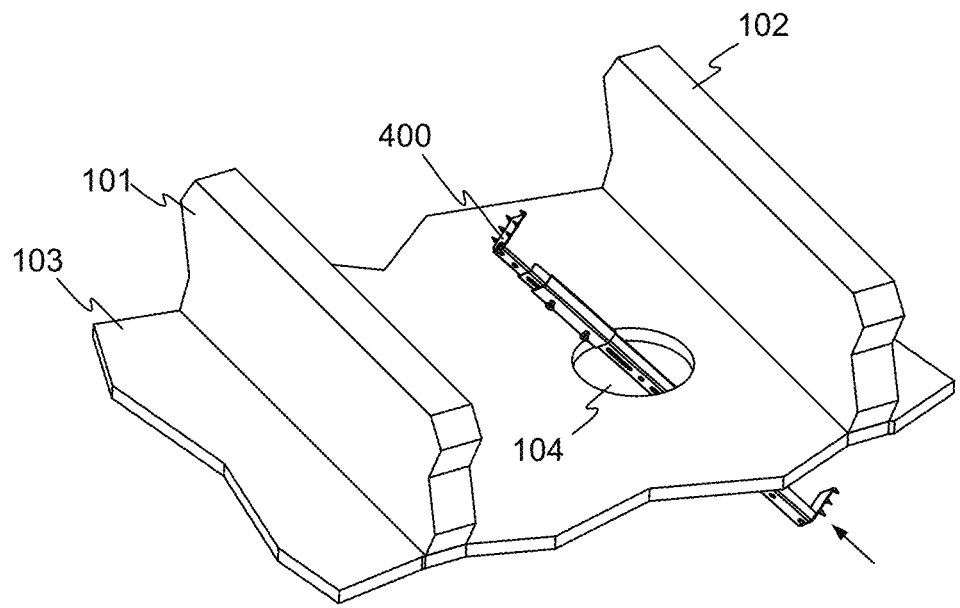
FIG. 7 illustrates a step in the installation of the bracket of FIG. 4, in accordance with embodiments of the invention.

FIG. 7 illustrates a step in the installation of the bracket 400, in accordance with embodiments of the invention. After the bracket 400 has been set to the desired length (for example slightly longer than distance W between the joists 101 and 102), the bracket 400 is inserted into the pre-cut opening 104 in the ceiling panel 103. While FIG. 7 shows the process from above for better viewing, the installation is preferably performed entirely from below the ceiling panel 103.

Figure 8:
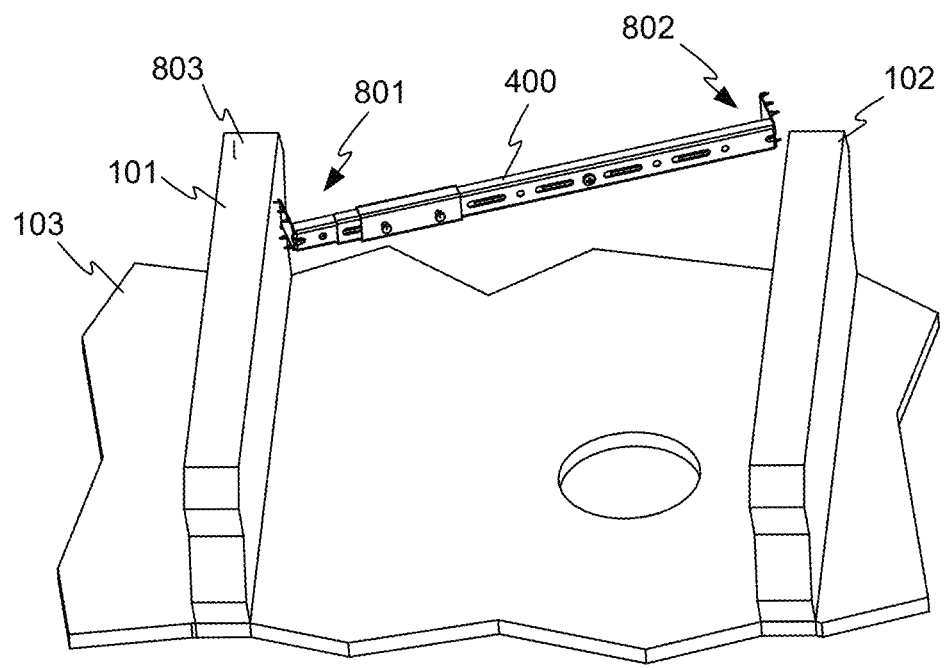
FIG. 8 illustrates another step in the installation of the bracket of FIG. 4.
Figure 9:
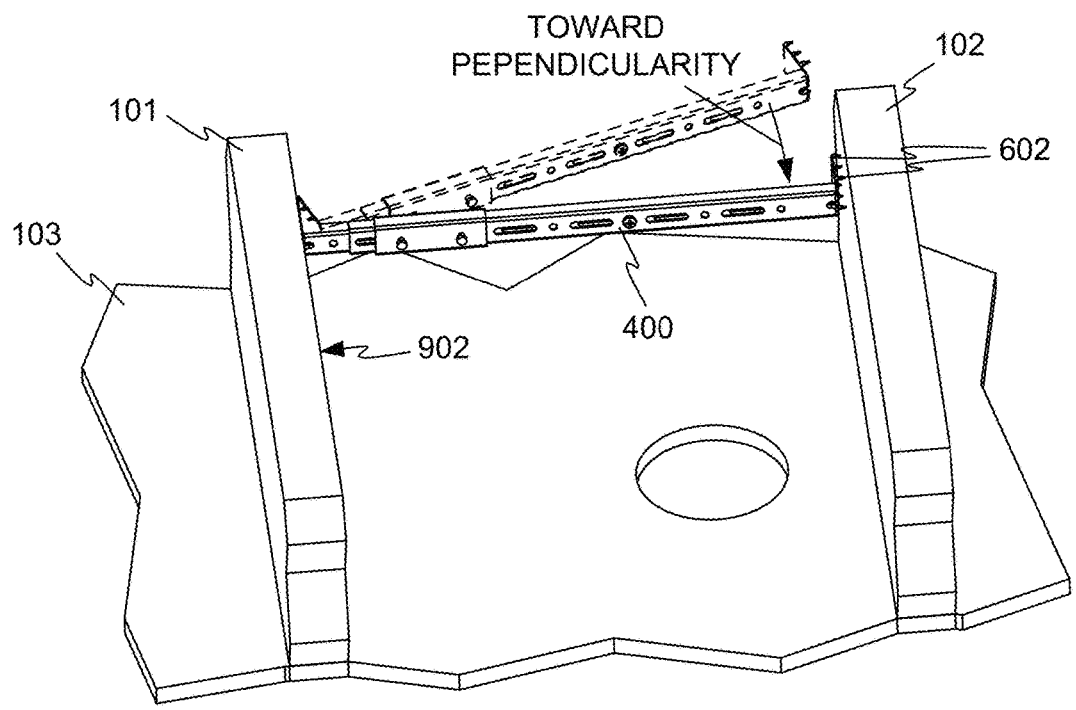
FIG. 9 illustrates another step in the installation of the bracket of FIG. 4.

FIGS. 8 and 9 illustrate another step in the installation of the bracket 400. As shown in FIG. 8, one end 801 of the bracket 400 is placed against one of the joists 101 or 102, with the other end 802 being free inside the joist cavity. In the example shown, the end 801 is placed against the joist 101. Preferably, the end 801 contacts the joist 101 near the top 803 of the joist 101.

As shown in FIG. 9, the bracket 400 is then wedged between the joists 101 and 102, by moving the bracket 400 toward perpendicularity with opposing faces 901 and 902 of the joists 101 and 102 while the ends of the bracket 400 contact the joists 101 and 102. The installer preferably reaches upward through the opening 104 in the ceiling panel 103 and pulls the bracket 400 toward its installed position. In the example shown, because the bracket 400 is longer than the distance between the joists 101 and 102, the pointed features 602 at the ends of the bracket 400 dig into the joists 101 and 102. That is, the bracket 400 and the joists 101 and 102 interfere. Once the bracket 400 is wedged into position, it remains there by virtue of the interaction of the pointed features 602 and the joists 101 and 102. The natural compliance of the end 601 of the bracket 400 may facilitate installation of the bracket, holding the bracket between the joists 101 and 102 with increasing force while the bracket 400 is moved toward perpendicularity.

It is not necessary for the bracket 400 to be perfectly perpendicular to the opposing faces 901 and 902 of the joists 101 and 102 after installation. While any workable length may be used, the bracket 400 is preferably set to a length that can be wedged between the joists 101 and 102 with sufficient force that the bracket 400 supports itself against the joists 101 and 102. In some embodiments, the length of the bracket 400 may be set to be between 1/16 inch and 6 inches more than the distance between the joists 101 and 102.

In other embodiments, friction may be used to hold the bracket 400 in place. For example, the bracket 400 may include compliant or somewhat "springy" features such as the ends 601, that may deform as the bracket 400 is wedged into position, pushing against the joists 101 and 102 so that friction between the bracket 400 and the joists 101 and 102 holds the bracket 400 in place. The bracket 400 does not include any machine forcing the ends of the bracket 400 against the joists 101 and 102. For example, no screw jack, ratchet, or other device is present. The ends of the bracket 400 are forced against the joists 101 and 102 solely by virtue of the bracket 400 being wedged between the joists 101 and 102. In some embodiments, no pointed features such as pointed features 602 need be provided. In some embodiments, friction between the bracket 400 and the joists 101 and 102 may be enhanced, for example by placing rubber or another friction-enhancing material between the bracket 400 and the joists 101 and 102. For example, rubber pads may be adhered or otherwise attached to the ends of the bracket 400 and positioned to contact the joists 101 and 102 when the bracket 400 is installed. In other embodiments, friction between the base material of the bracket 400 and the joists 101 and 102 is sufficient.

Figure 10:
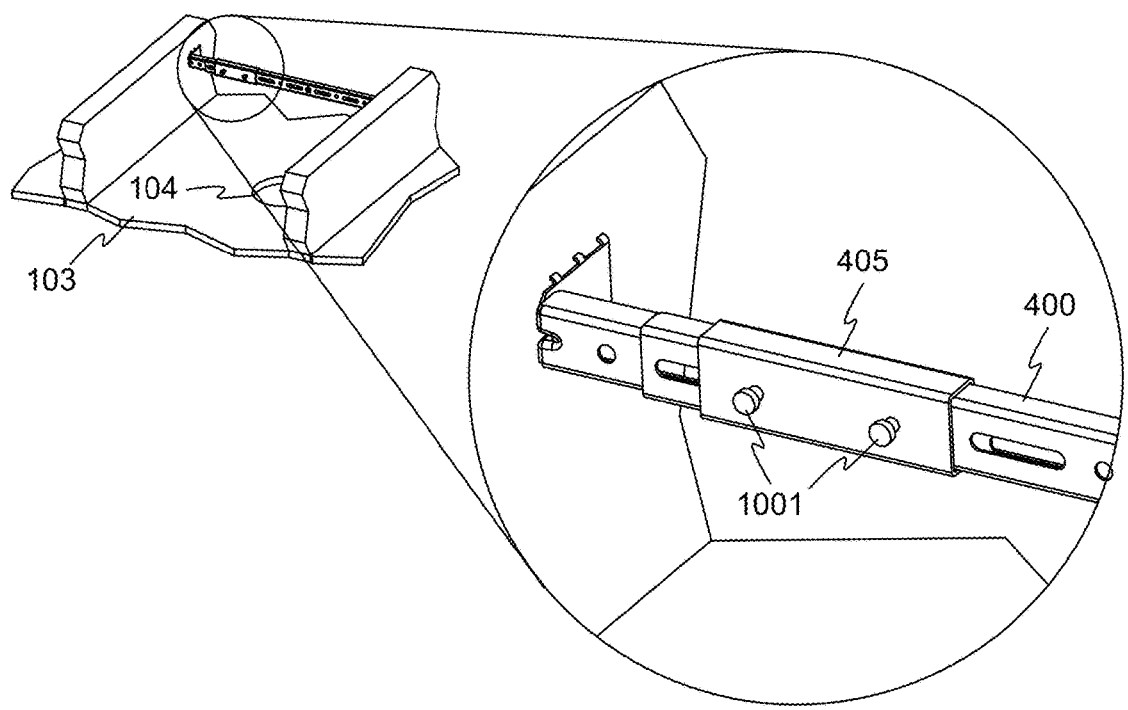
FIG. 10 shows a clip in accordance with embodiments of the invention.

In some embodiments, a mount may be provided or installed on the bracket 400 for supporting a junction box. One example of such a mount is clip 405 shown in FIG. 10. The example clip 405 snaps over the bracket 400 and includes studs 1001 or other features on which to hang the junction box. To attach the clip 405 may be attached to the bracket 400 before the bracket 400 is installed in the joist cavity, or the user may pass the clip 405 through the opening 104 in the ceiling panel 103 and attach it after the bracket 400 is wedged in place.

The clip 405 may be made of any suitable material and by any suitable process. In one embodiment, the clip 405 is injection molded from a plastic, with the studs 1001 being integrally formed in the molding process. The clip 405 may be flexible enough to open and snap over the bracket 400. In other embodiments, the clip 405 may be rigid or semi-rigid, and may be slid onto the bracket 400 before the pieces of the bracket 400 are fixed together. In other embodiments, the clip 405 may be made of metal or another material. In some embodiments, the clip 405 may be pieced together from multiple parts. In some embodiments, the clip 405 or other mount may fit loosely on the main pieces so that it can slide to a convenient position for holding the junction box 201.

In some embodiments, no separate clip may be necessary. For example, hook features may be formed integrally in the bracket 400 during sheet metal stamping, may be attached to a member of the bracket 400, or may be formed by another method.

Figure 11:
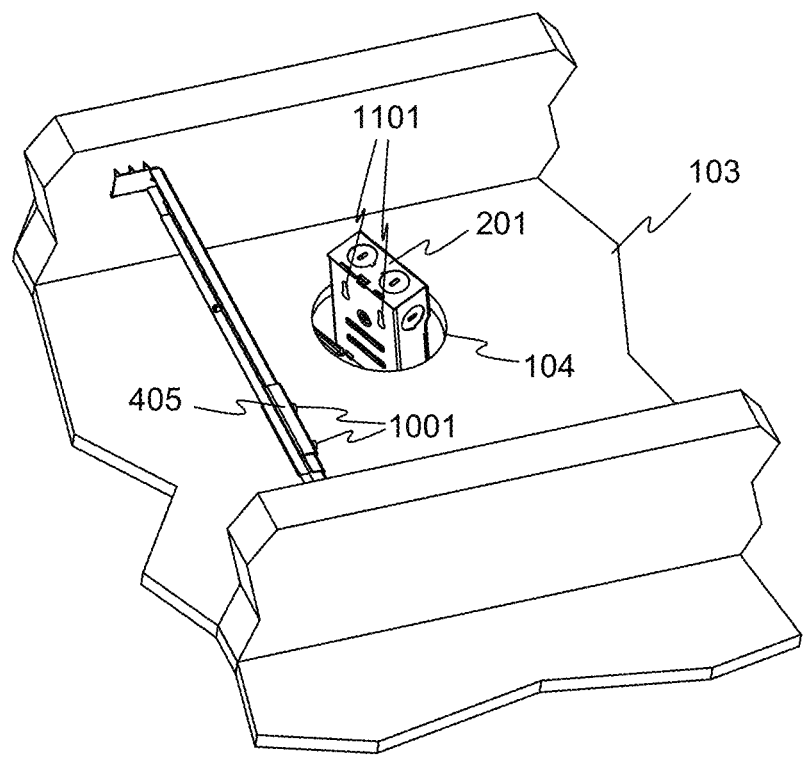
FIG. 11 illustrates another step in the installation of the bracket of FIG. 4.

FIG. 11 shows another step in the installation of the light fixture 200 in the joist cavity, in accordance with embodiments of the invention. The junction box 201 is passed upward through the opening 104 in the ceiling panel 103. Electrical wiring such as line voltage wiring (not shown) is preferably pulled downwardly through the opening 104 and connected to the junction box 201 by conventional methods before the junction box 201 is inserted through the opening 104 into the joist cavity. The junction box 201 preferably includes one or more features for attaching the junction box 201 to the bracket 400. In the example shown, the junction box 201 includes keyhole slots 1101 shaped and sized to engage with the studs 1001 on the clip 405. In other embodiments, other kinds of features may be used.

Figure 12:
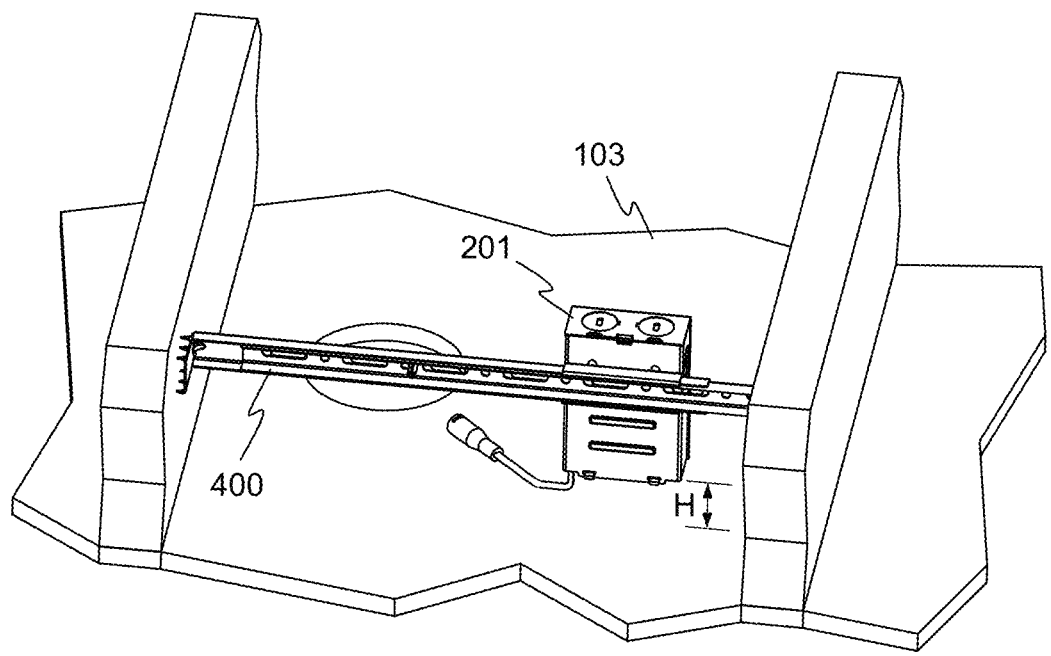
FIG. 12 shows the position of junction a box after it is attached to the bracket of FIG. 4.

FIG. 12 shows the position of the junction box 201 after it is attached to the bracket 400. The junction box 201 is suspended above the ceiling panel 103 (and above the bottom edges of the joists 101 and 102) by a distance H.

Figure 13:
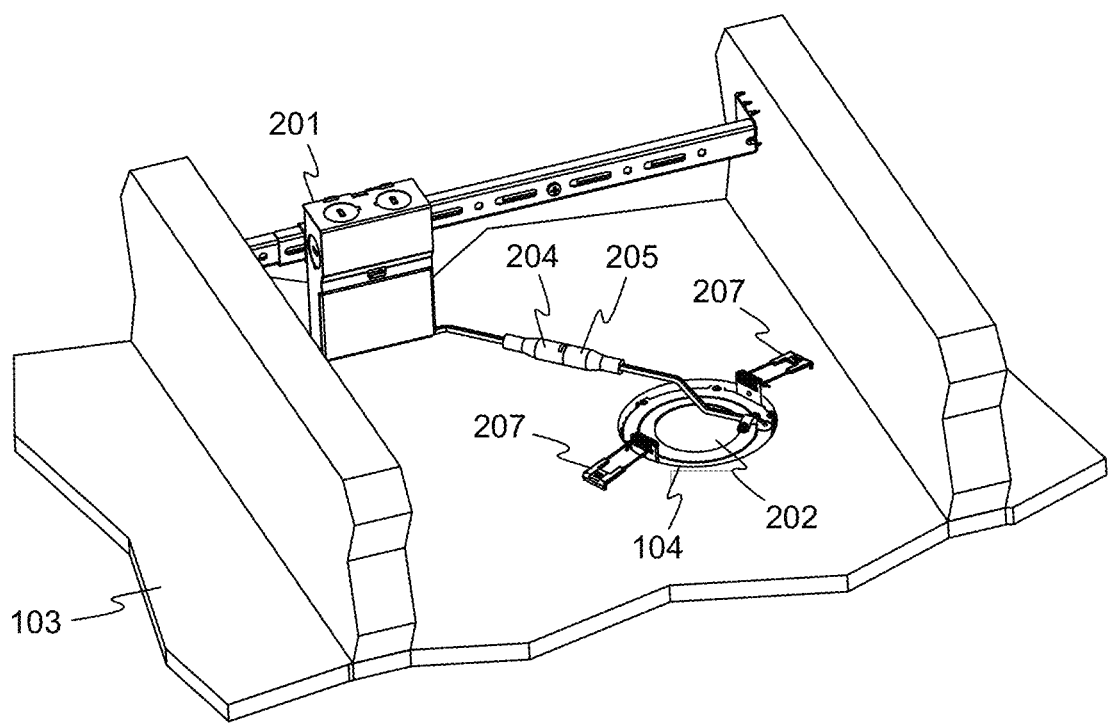
FIG. 13 is an upper view of a completed installation of a luminaire in a joist cavity, in accordance with embodiments of the invention.
Figure 14:
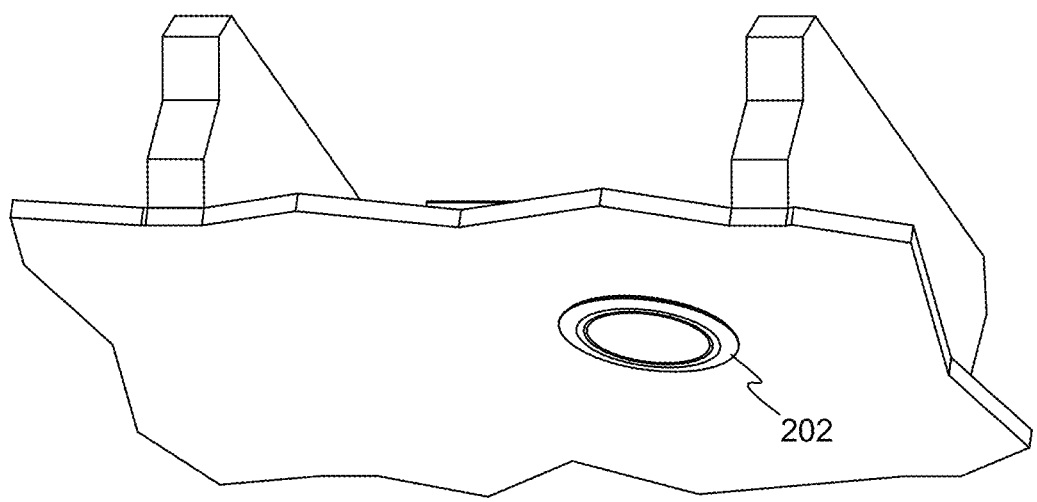
FIG. 14 is a lower view of a completed installation of a luminaire in a joist cavity, in accordance with embodiments of the invention.

Once the junction box 201 is in place, the luminaire 202 can be installed as shown in FIG. 13. The connectors 204 and 205 are engaged to electrically connect the luminaire 202 to the junction box 201, and the luminaire 202 is installed in the opening 104 of the ceiling panel 103. The example luminaire 202 includes spring clips 207, which are rotated upward to allow them to pass through the opening 104, and then allowed to contact the ceiling panel 103 to hold the luminaire 202 upward against the ceiling panel 103. Other techniques for mechanically retaining a luminaire in a ceiling panel may be used in other embodiments. FIG. 14 shows the installation from below the ceiling, with only the luminaire 202 showing.

While the above examples describe retrofitting of a light such as the light fixture 200 into an existing joist cavity, it will be recognized that a bracket embodying the invention may be used in new construction as well. For example, the bracket 400 could be wedged between ceiling joists such as the ceiling joists 101 and 102 before a ceiling panel such as the ceiling panel 103 is installed.

It will be apparent to those skilled in the art that various modifications and variations can be made in the method and system of the present invention without departing from the spirit or scope of the invention. Thus, it is intended that the present invention include modifications and variations that are within the scope of the appended claims and their equivalents.

What is claimed is:

1. A method of installing a luminaire between two joists, the method comprising:
   providing a bracket having opposite ends;
   setting the length of the bracket to be longer than the distance between the two joists, wherein setting the length of the bracket is accomplished by direct movement of a first piece of the bracket in relation to a second piece of the bracket without the use of a machine;
   fixing the length of the bracket;
   inserting the bracket into a cavity between the two joists, wherein inserting the bracket into the cavity comprises inserting the bracket through an opening in a panel previously fixed to the joists;
   wedging the bracket between the two joists such that the bracket is supported by friction or interference between the opposite ends of the bracket and the two joists, wherein wedging the bracket between the two joists comprises moving the bracket toward perpendicularity with opposing faces of the two joists while the ends of the bracket contact the two joists;
   hanging a junction box from the bracket, wherein the junction box houses a transformer;
   electrically connecting a low-voltage luminaire to the transformer; and
   installing the low-voltage luminaire in the opening in the panel.

2. The method of claim 1, wherein the two joists are ceiling joists having bottom edges, and wherein the junction box is hung from the bracket at a height so as to be positioned above the bottom edges of the ceiling joists.

* * * * *